March 9, 1971 E. R. NEHMANN ETAL 3,568,335
EDUCATIONAL COMPUTER
Filed Oct. 28, 1968 7 Sheets-Sheet 2

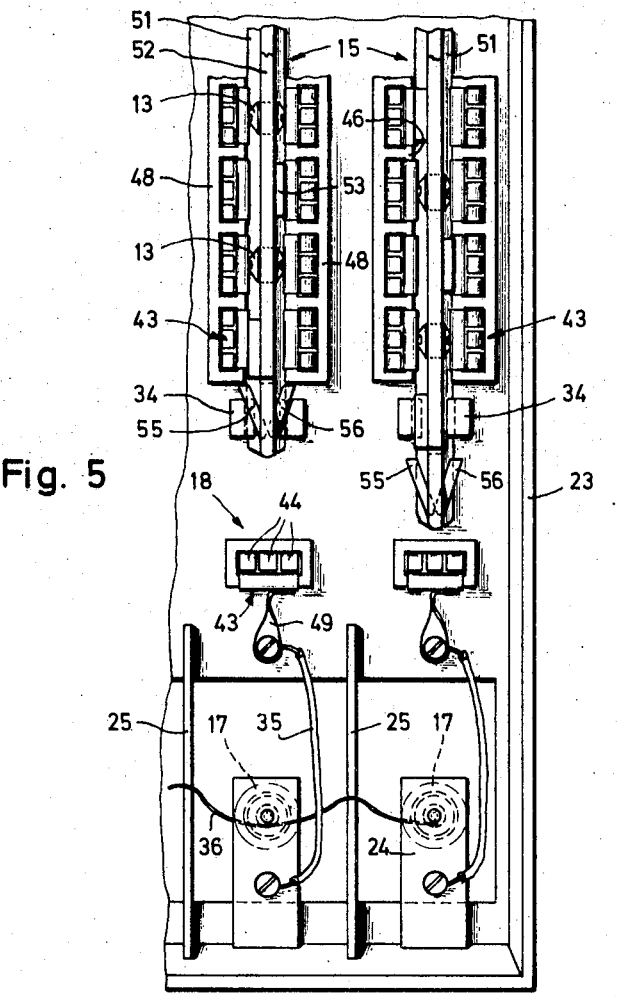

United States Patent Office 3,568,335
Patented Mar. 9, 1971

3,568,335
EDUCATIONAL COMPUTER
Euchar R. Nehmann, Leinfelden-Unteraichen, Horst Link, Boblingen, and Joachim Weimer, Stuttgart-N, Germany, assignors to Franckh'sche Verlagshandlung W. Keller & Co., Stuttgart-O, Germany
Filed Oct. 28, 1968, Ser. No. 771,189
Claims priority, application Germany, Feb. 7, 1968, P 16 78 336.1
Int. Cl. G09b 5/00
U.S. Cl. 35—30      16 Claims

ABSTRACT OF THE DISCLOSURE

An educational computer comprising a plurality of connecting groups, each of the connecting groups including a plurality of connecting points and sets of the connecting groups being arranged in rows on a programming board; and source of electricity; a plurality of indicators each associated with the set of connecting groups in one of the rows and connected with the source of electricity; a key connected with the source of electricity and the connecting groups; a plurality of wires for connecting the plurality of indicators with the connecting groups; and a plurality of movable contactors each associated with the set of connecting groups in one of the rows to selectively connect adjacent connecting points in a connecting group.

BACKGROUND OF THE INVENTION

The present invention pertains to educational computers and more particularly to educational computers capable of being assembled and programmed by laymen and juveniles.

The use of computers is increasing to such great proportions that it is desirable for those of any profession or line of work to understand the basic concepts involved with computer operation, construction, and programming. Furthermore, since each generation will utilize and depend on computers more than the previous generation it is desirable for children to become acquainted with computers at as early an age as possible in order to facilitate their later training and understanding of computers.

Computers have been utilized in almost every field of endeavor to save valuable time and manpower. For example, computers are used to control space vehicles, compute taxes, translate, provide medical diagnoses, provide weather forecasts, and automatically control chemical and mechanical industrial processes; and modern computers are capable of playing a game of chess against a human adversary. Modern computers must be complex, as is easily discernible, in order to perform the varied tasks and complicated computations required of them; and, consequently, it is almost impossible for a layman or a juvenile to gain an understanding of computers without expending a great amount of time.

While there may be an incentive for an adult to learn about computers, there is none for juveniles, and due to the complex and technical nature of computers the average juvenile loses interest readily even though the benefits of such knowledge are great.

SUMMARY OF THE INVENTION

Accordingly, it is an object of the present invention to provide an educational computer that is easily assembled and simply programmed.

Another object of the present invention is to provide a computer that may be assembled without utilizing special tools or soldering electrical contacts.

The present invention has another object in that an educational computer utilizes a plurality of connecting groups arranged in rows on a programming board to facilitate programming.

Another object of the present invention is to utilize a key with an educational computer for contrrolling the operation thereof by electrically connecting the key to a plurality of connecting groups.

A further object of the present invention is to utilize claw-like contacts in an educational computer, which contacts may be secured to ribs on a programming board by barbs that snap into recesses in the ribs.

Some of the advantages of the present invention are that the output of the educational computer may be viewed easily and with identifying labels, that the educational computer may be easily assembled without special tools, and that patterns may be utilized to aid in the programming of the computer.

The present invention is generally characterized in that an educational computer comprises a plurality of connecting groups, each group including a plurality of connecting points, movable contactor means for electrically connecting two of the connecting points included in one connecting group, a source of electricity, indicator means, and connecting means for electrically connecting the source of electricity with the indicator means through the plurality of connecting groups.

Other objects and advantages of the present invention will become apparent from the following description and the accompanying drawings.

BRIEF DESCRIPTION OF THE DRAWINGS

FIG. 5 is a partial bottom view of the portion of the educational computer shown in FIG. 4 taken in the direction of arrow 4.

DESCRIPTION OF THE PREFERRED EMBODIMENT

Figure 1:
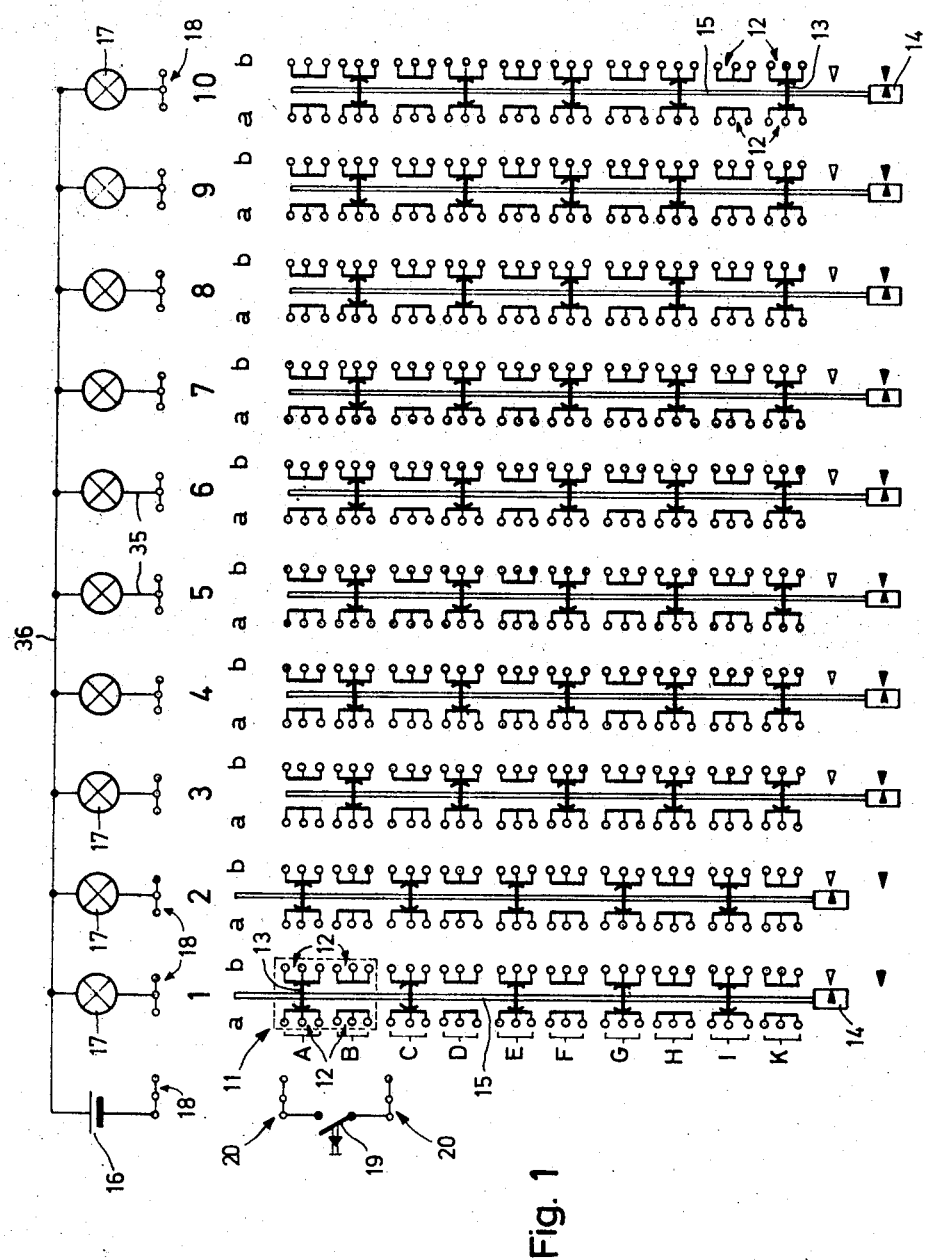
FIG. 1 is a schematic diagram of the circuitry of an educational computer according to the present invention.

The basic circuitry of the educational computer of the present invention is shown in FIG. 1 and includes a plurality of basic connecting elements. Each basic connecting element includes a connecting group 11 having four connecting points 12, and each connecting point 12 includes three contacts, which may take the form of a sleeve or clamp, electrically connected together. The number of contacts included in each connecting point 12 is dependent upon the complexity of the programs for use with the educational computer; and, accordingly, while the connecting points are shown as each including three contacts, it is clear that the number of contacts may be varied.

The connecting groups 11 are arranged in sets of five connecting groups, and the connecting groups in each set are aligned in rows designated by reference numerals 1 through 10. The connecting points 12 disposed on the left of each group are designated *a* and the connecting points disposed on the right of each group are designated *b*. The connecting points in each of the sets of groups in each row are designated, A, B, . . . ., K, correspondingly.

Each connecting group 11 is associated with a moveable contactor 13 which is attached to a slide 15 having a handle 14 and, as shown in FIG. 1 contactors 13 connect contact points 11A, C, E, G and I of row 1. By moving slide 15 downward, contactors 13 may be moved so that they connect connecting points B, D, F, H and K of row 1, and this operation is the same for the slides and contactors associated with each of rows 1 through 10.

The number of connecting points 12 associated with each group 11 may vary in that if contractor 13 is connected constantly with one connecting point in row *a* of a group and changeable to connect either of the connecting points in row *b* of that group, only three connecting points need be utilized. Clearly, more connecting points may be utilized if it is desired to utilize a three or more position contactor.

A current source 16, such as a flash light battery, is connected to a plurality of indicators 17 which are shown as light bulbs but may comprise acoustic indicators or any other suitable output devices. Current source 16 and indicators 17 are connected to contacts 18 which may be sleeves or clamps, and the positive terminal of current source 16 is connected directly to indicators 17 so that no short circuits can occur should there be a fault in the computer.

A spring loaded key 19 is connected with contacts 20, which may be sleeves or clamps, and is normally biased into an open position, and one contact of key 19 may be connected permanently with the negative terminal of current source 16. The circuitry thus far described provides a plurality of contacts 12, 18 and 20 which may be connected through electrical wires to provide a program so that operation or movement of contactors 13 will cause energization of selective ones of indicators 17 and viewing of indicators 17 can determine whether the computer is being properly used or for instance whether a correct solution of a problem has been determined, as will be explained hereinafter.

Figure 2:
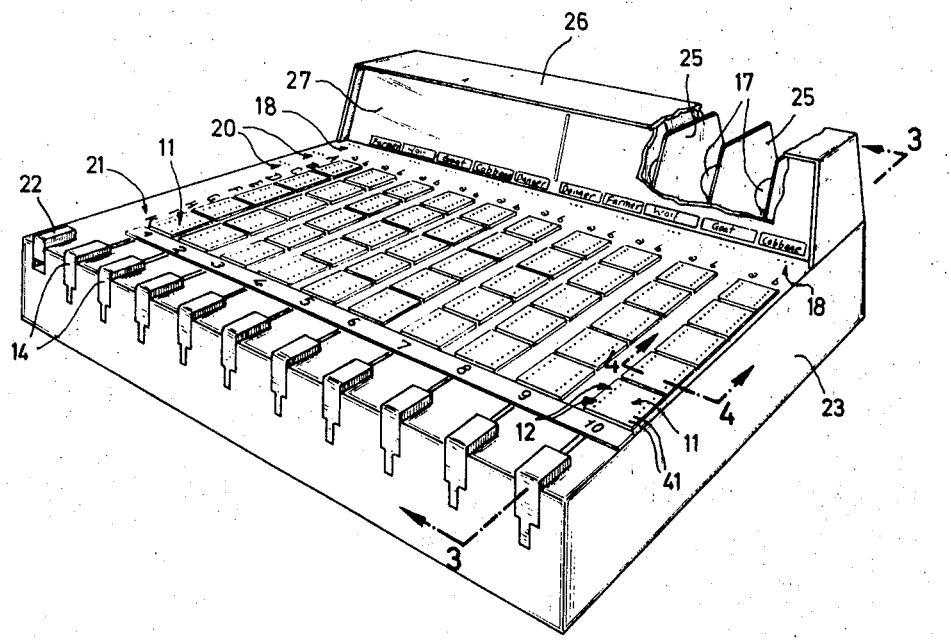
FIG. 2 is a perspective view, with parts broken away, of an educational computer according to the present invention.

FIG. 2 is a perspective view of the educational computer of the present invention which includes a slightly slant programming board 21 on which groups 11 are arranged. Handles 14 of slides 15, which carry contactors 13, are disposed at the lower edge of programming board 21, and an operating knob 22, which controls spring loaded key 19 is disposed at the left-hand lower corner of the programming board. Labels for the rows and lines of connecting points 12 are provided on programming board 21 so that each connecting point may be easily identified in order to facilitate programming of the educational computer.

Figure 3:
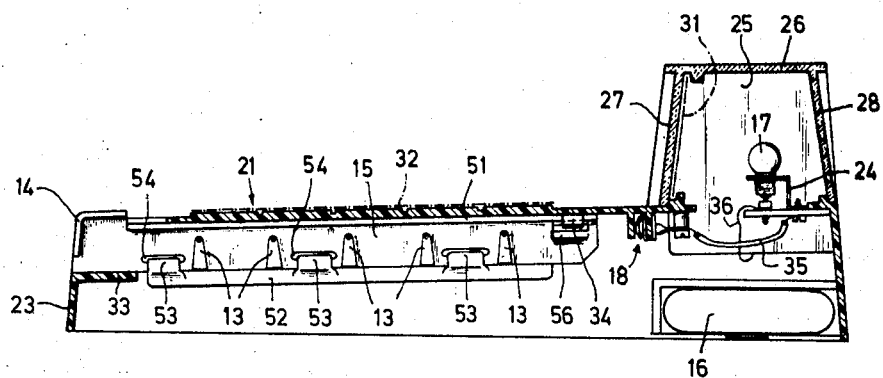
FIG. 3 is a sectional view taken along lines 3—3 in FIG. 2.

Programming board 21 is disposed on the top of a housing 23, which may be constructed of plastic, and indicators 17 are screwed into sockets 24 at the rear edge of housing 23, as shown in FIG. 3. Each indicator 17 is isolated from the other indicators by light-tight separating walls 25, and a removable hood 26 is disposed over the indicators 17 and the separating walls 25. Removable hood 26 includes a transparent colored plastic material on a front wall 27 facing the programming board and a rear wall 28 of hood 26 may also be constructed of transparent colored plastic material such that energization of the indicators can be viewed from either side of the educational computer. Thus energization of an individual indicator 17 will cause light to be emitted in only that compartment containing the energized indicator.

A foil 31 may be disposed along front wall 27 of hood 26 and foil 31 may be provided with labels associated with the program utilized by the computer. As shown in FIG. 2 the labels farmer, wolf, goat and cabbage as well as particular lines separating rows 5 and 6 have been placed on a foil 31 disposed behind row 25. These labels and symbols are associated with a program which will be described hereinafter. It is clear that a similar foil may be disposed along rear wall 28 in order to provide indicia for the lighted area of rear wall 28 of hood 26.

A programming diagram or pattern 32 is indicated by a broken line in FIG. 3 and may be placed on programming board 21 to facilitate the arrangement of the wires for programming the computer. Programming diagram 32 is provided with holes in order to indicate to the programmer where wires are to be inserted, and, accordingly, to accommodate the wires to provide connections with the proper connecting points. Programming diagram 32 may be constructed of a plastic sheet or foil, and a plurality of programming diagrams may be interchangeably used with the computer due to its simplified construction. These programming diagrams may be simply constructed by the programmer in order to facilitate the use of the computer to solve problems for which there is provided no program.

The arrangement of slide 15 below programming board 21 is shown clearly in FIG. 3, and slide 15 is mounted longitudinally slidably at handle 14 on a shoulder 33 of housing 23, and at its upper end slide 15 is supported by butt straps 34 which are suspended on the underside of programming board 21. Each indicator 17 is connected by means of a permanent wire 35 to its respective contacts 18, and a permanent wire 36 leads to the next successive indicator 17.

Figure 4:
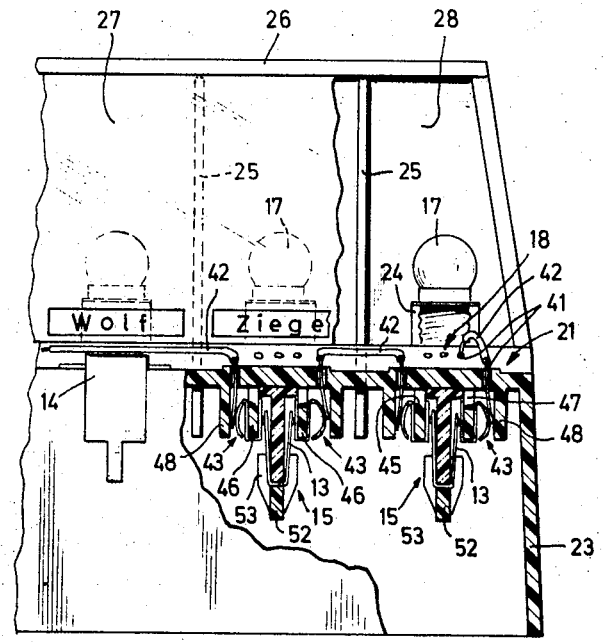
FIG. 4 is a partial sectional view taken along lines 4—4 in FIG. 2.

The operation of slides 15 carrying contactors 13 with the connecting points is best shown in FIG. 4 wherein it can be seen that holes 41 in the programming board 21 are adapted to receive the bare ends of wires 42 arranged below programming board 21 may firmly contact the wires. When slides 15 are in the position shown in FIG. 4 contactors 13 will connect the contact springs 43 of connecting points in the same line of a group electrically with one another.

Figures 6, 7:
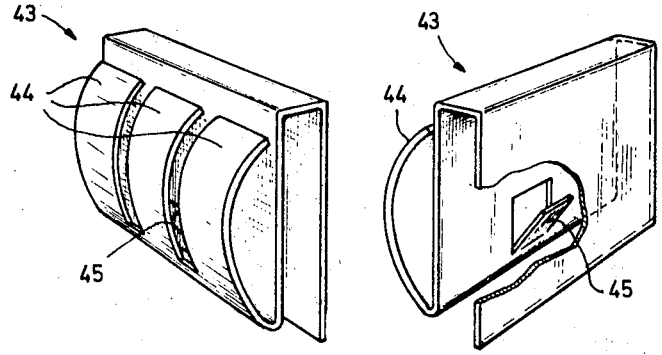
FIG. 6 is a perspective view of a contact spring for use with the present invention.
FIG. 7 is a perspective view with parts broken away of the contact spring of FIG. 6.

Claw-like contact springs 43 are shown in perspective in FIGS. 6 and 7 and have an essentially U-shaped configuration with three resilient contact reeds 44, arranged on one leg of the contact spring. A barb 45 is provided on the leg carrying the contact reeds 44, and the other leg has a smooth surface. Contact springs 43 are disposed on ribs 46 which extend from the underside of programming board 21 and barbs 45 extend into recesses 47 of ribs 46 to firmly hold contact springs 43 in place such that each of the contact reeds 44 will be disposed directly below one of the holes 41. Contact reeds 44 are shaped so that they abut ribs 48 which are spaced from ribs 46 and extend from the underside of programming board 21 so that insertion of the bare ends of wires 42 through holes 41 permits the bare ends to be forced against ribs 48 by contact reeds 44 to thereby provide good electrical contact and to firmly secure the wires.

As seen in FIG. 5, contact springs 43 are also utilized with contacts 18 which are connected with indicators 17 and are held in place by similar ribs and barbs 45. A resilient contact 49 is adapted to abut the smooth surface leg of contact spring 43 to establish electrical contact with wire 35.

Figure 8:
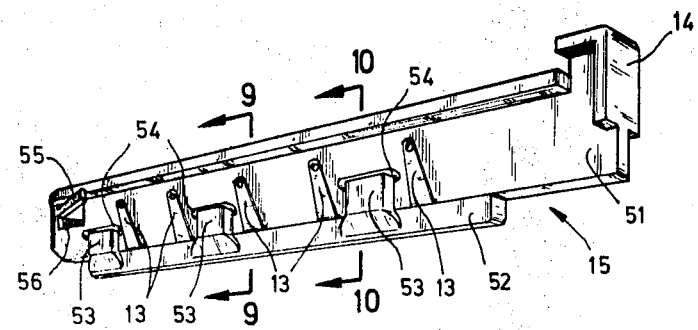
FIG. 8 is a perspective view of a slide for use with the present invention.
Figure 9:
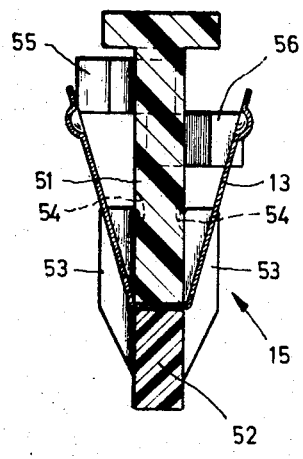
FIG. 9 is a sectional view taken along lines 9—9 in FIG. 8.
Figure 10:
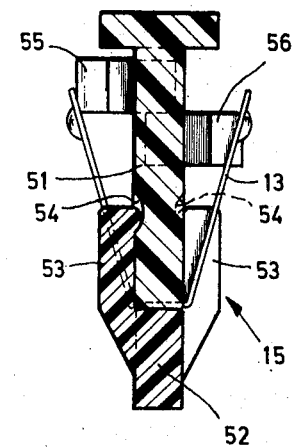
FIG. 10 is a sectional view taken along lines 10—10 in FIG. 8.

The structure of slide 15 can best be seen from FIGS. 8, 9 and 10. Slide 15 is assembled from parts 51 and 52 which are connected together through a snap action to grip contactor 13. Elastic clamps 53 are provided on lower part 52 and engage lateral recesses 54 in the upper part 51 to provide a firm assembly.

At the end of slide 15 away from handle 14, two elastic stops 55 and 56 are provided to prevent removal of slide 15 after it is inserted into its sliding guide. Upon insertion of slide 15 into the guide, stops 55 and 56 are compressed in order to move past ribs 46; however, stops 55 and 56 spring back into their original shape after passing rib 46 and the abutting of stops 55 and 56 with ribs 46 prevent removal of slide 15 from the guide.

Thus it can be seen that the educational computer of the present invention is constructed from a small number of simple elements which may be assembled without difficulty by a person of ordinary intelligence without special tools. Specifically it is noted that the electrical connections do not require soldering, and all contacting parts are simply plugged or screwed in. Consequently, the educational computer of the present invention may be easily assembled after purchase in a do-it-yourself fashion.

Figure 11:
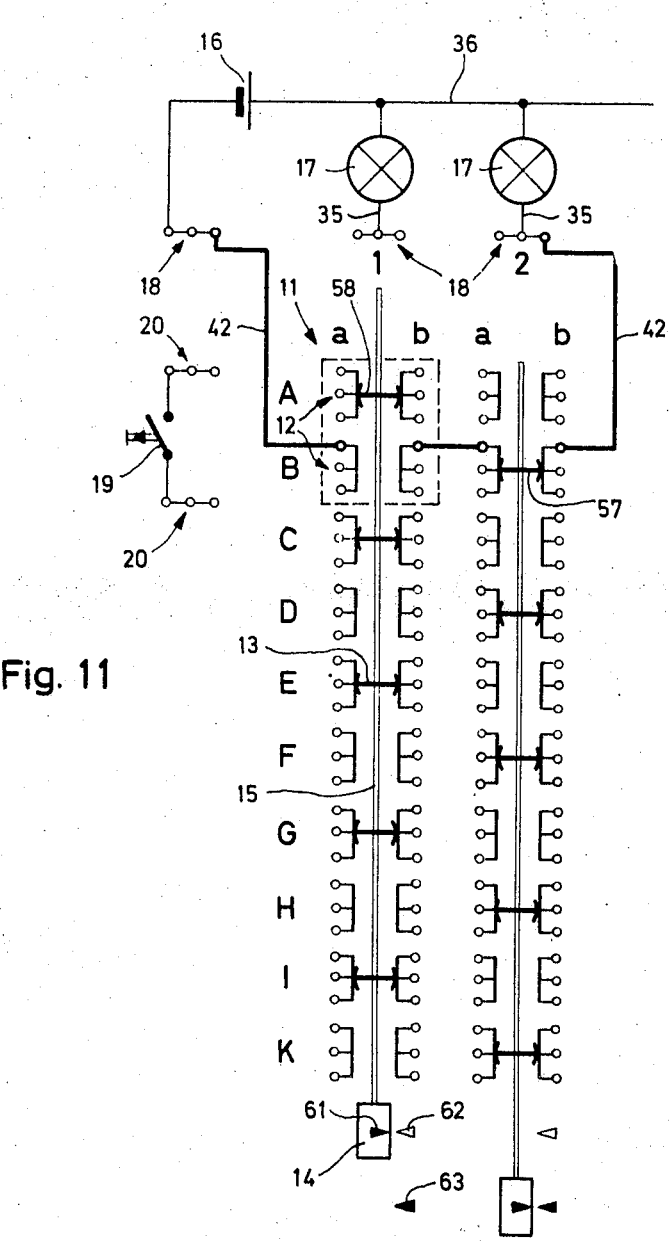
FIG. 11 is a schematic diagram of an AND circuit constructed with the computer of the present invention.

FIG. 11 is a schematic diagram of a simple example of the logican AND circuit. While FIG. 11 illustrates only the AND circuit, it is realized that due to the unique assembly of the connecting elements of the present invention, the present invention may be wired to perform any of the logical functions such as OR, NOR, NAND, or NOT. The circuitry of the present invention performs these logical functions by simply utilizing a light which can be energized only by a complete electrical circuit. That is, when there is a complete current path from the positive pole of the current supply through the lights and back to the negative pole of the current supply. Thus to provide an AND circuit two or more switches need only be connected in series so that they all must be closed to energize the light; that is, if two switches are used, both the condition which causes closure of the first switch and the condition which causes closure of the second switch must be present for the light to be energized.

For example, suppose the two conditions are those necessary for the forming of ice on a street; that is, the first condition is that the street must be wet and the second condition is that the temperature must be below freezing. Now if each of the two series switches is associated with one of the above conditions, the light cannot be energized unless the street is wet and the temperature is below freezing. If only one of these conditions is present, that is if only either the temperature is below freezing or the road is wet, the light will not be energized due to the open circuit in the switch associated with the condition which is not present, and if neither condition is present the light cannot be energized for the same reason.

In FIG. 11 the light 17 in row 2 is utilized to indicate the occurrence of the AND conditions and is connected to the positive pole of current source 16 by a wire 36 and to the negative pole of current source 16 through contacts 18, wire 42, switch 2B, switch 1B, wire 42 and contacts 18. Thus, in the condition shown in FIG. 11 with handle 14 of row 1 moved up so that black arrow 61 is adjacent white arrow 62 no circuit is completed due to the open switch 1B even though switch 2B is closed.

Assuming now that the energization of light 17 indicates ice on a street, movement of handle 14 in row one indicates the moisture on the street and movement of handle 14 of row 2 indicates the temperature, it can be seen that icy conditions do not exist because the street is not wet.

It is obvious from the above simple explanation that the connecting elements of the present invention may be utilized not only to provide simple logical functions as previously described, but also to provide more complex logical functions or sequences of logical functions.

Figure 12:
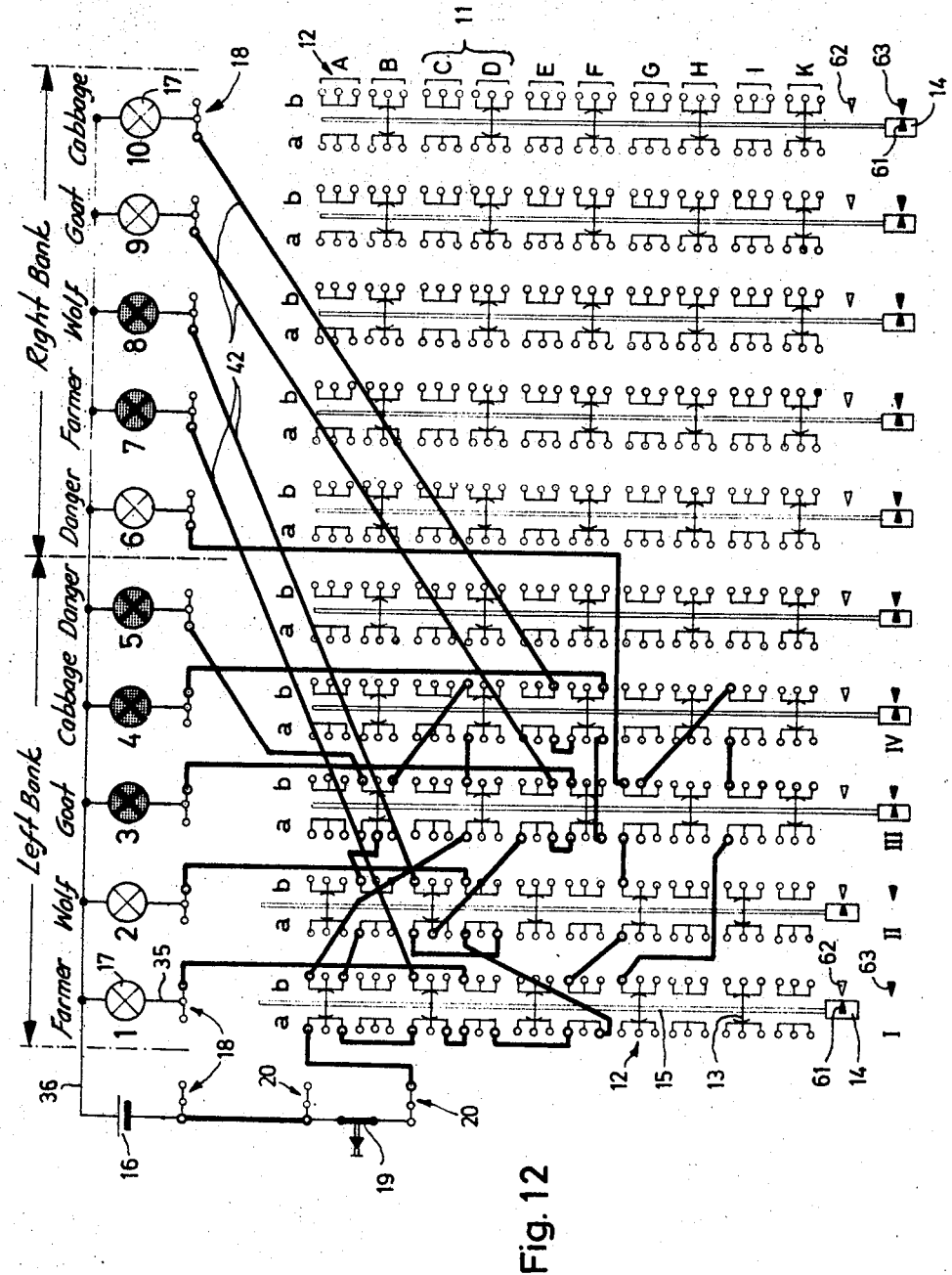
FIG. 12 is a schematic diagram of a wired program for use with the computer of the present invention in solving a specific problem.

FIG. 12 is a schematic diagram of a computer according to the present invention as programmed for use with a specific problem. As an example, the problem is that a farmer, a wolf, a goat and a head of cabbage are on the left bank of a river and it is desired to transport all of them to the right bank of the river. The farmer can ferry only one of these objects in one crossing of the river, and he must be careful not to leave on either bank of the river two objects one of which would devour the other out of his presence. Thus, the farmer cannot leave either the wolf with the goat or the goat with the head of cabbage, while it is not harmful to leave the wolf and the head of caggabe together. The programming board 21 is arranged such that the first five rows 1–5 represent the location on the left bank of the river, of the farmer, the wolf, the goat and the head of cabbage and whether danger exists at the left bank, respectively, and similarly rows 6–10 indicate danger, the farmer, the wolf, the goat and the head of cabbage on the right bank of the river. With this arrangement wires 42 are utilized to program the computer through various logical connections such that the movement of slides 15 cause the occurrence of a combination of events which energize lights 17 to indicate the results from the input conditions.

Rows 1, 2, 3 and 4 are designated I, II, III and IV, respectively, in order to facilitate the explanation of a simple move in solving the problem for which the computer is programmed. Thus, it can be seen that switch I changes the location of the farmer, switch II that of the wolf, switch III that of the goat and switch IV that of the head of cabbage from one bank to the other. By moving handle 14 up so that black arrow 61 will be adjacent white arrow 62, the object is indicated as being ferried from the left bank of the river to the right bank, and, accordingly, when handle 14 is moved so that black arrow 61 is adjacent black arrow 63, the corresponding object is on the left bank of the river.

Energization of lights 17 indicates on which bank an object is positioned, and danger lights 5 and 6 indicate when energized that a condition exists on the left or right bank of the river, respectively, that is not permissible.

Thus, since the handles of switches I and II moved up, it is indicated that the farmer and the wolf have been transferred to the right bank of the river; and accordingly, the goat and the head of cabbage remain on the left bank of the river. Since the goat will eat the head of cabbage the danger light 5 is energized.

By utilizing spring loaded key 19 all conditions or changes to be fed to the computer may be decided upon before operation of the computer; that is, the switch associated with key 19 is normally open and unless key 19 is depressed, the computer cannot operate. This permits a number of players to participate in a competitive game with the computer of the present invention and furthermore makes all decisions as to input conditions final.

Therefore, it can be seen that the educational computer of the present invention permits a layman or a juvenile to gain an insight, starting with basic principals, to logical thinking and the operation of a computer, and the individual when utilizing the educational computer of the present invention will learn the process of programming along with exercising his logic.

In as much as the present invention is subject to many variations, modifications and changes in detail, it is intended that all matter described in the foregoing specification or shown in the accompanying drawings shall be interpreted as illustrative and not in a limiting sense.

What is claimed is:

1. An educational computer comprising a plurality of connecting groups arranged in sets, each of said connecting groups including a plurality of connecting points, movable contact means for electrically connecting two of the connecting points included in one connecting group, said movable contact means including a plurality of contactors each contactor being associated with one of said plurality of connecting groups in one of said sets, means mechanically coupling said contactors whereby said contactors may be moved in unison, a source of electricity, indicator means, and connecting means for electrically connecting said source of electricity with said indicator means through said plurality of connecting groups.

2. The invention as recited in claim 1 wherein said source of electricity includes a terminal; and said connecting means includes means for permanently connecting said terminal of said source of electricity to said indicating means whereby short circuits are prevented.

3. The invention as recited in claim 1 wherein said connecting means includes key means for actuating a normally open switch, said normally open switch being connected with said plurality of connecting groups whereby a circuit cannot be completed without depressing said key means to close said normally open switch.

4. The invention as recited in claim 3 wherein said source of electricity includes first and second terminals; said key means includes contacts connected with said normally open switch means and said connecting means includes first means connecting said first terminal of said source of electricity with said indicating means and second means connecting said contacts of said key means with said second terminal of said source of electricity.

5. The invention as recited in claim 4 wherein said indicator means includes contacts; and said connecting means includes wires of different colors connected with said contacts of said indicator means and said connecting points of said plurality of said connecting groups.

6. The invention as recited in claim 1 wherein said sets of said plurality of connecting groups are arranged in rows on a programming board.

7. The invention as recited in claim 6 wherein said connecting points include spring contacts secured to said programming board.

8. The invention as recited in claim 7 wherein said spring contacts include barbs and said programming board includes a plurality of ribs having recesses therein whereby said connecting points are secured to said programming board by said barbs being snapped into said recesses of said ribs.

9. The invention as recited in claim 8 wherein said movable contactor means includes a plurality of slides, each slide having a plurality of said contactors disposed thereon and being associated with one of said rows of connecting groups.

10. The invention as recited in claim 9 wherein said spring contacts have a first side having a smooth surface, said first side being adapted to contact said contactors, and a second side having a plurality of springy reeds disposed thereon, said springy reed being adapted to contact said connecting means.

11. The invention as recited in claim 9 wherein each of said slides includes a bottom portion, a top portion, and means for snapping said bottom portion onto said top portion and clamping said contactors therebetween.

12. The invention as recited in claim 11 wherein each of said slides includes a deformable stop for abutting a portion of said programming board whereby unintentional removal of said slides is prevented.

13. The invention as recited in claim 9 wherein said indicator means includes a plurality of lights, each of said lights being associated with one of said rows of connecting groups.

14. The invention as recited in claim 13 wherein said indicator means includes a hood enclosing said plurality of lights in individual compartments, said hood being formed of transparent material.

15. The invention as recited in claim 14 wherein said hood has a sheet of partially transparent material disposed therein for identifying individual lights.

16. The invention as recited in claim 9 wherein said programming board includes a program pattern with holes therein for accommodating said connecting means.

References Cited
UNITED STATES PATENTS

| | | | |
|---|---|---|---|
| 2,627,672 | 2/1953 | Polton | 35—9 |
| 2,970,386 | 2/1961 | Knutson | 35—9 |
| 3,106,784 | 10/1963 | Raley | 35—9 |

WILLIAM H. GRIEB, Primary Examiner